March 25, 1958     W. M. TAYLOR     2,827,745
COMBINATION CHOPPER, WINDROWER AND CRUSHER
Filed Dec. 22, 1955
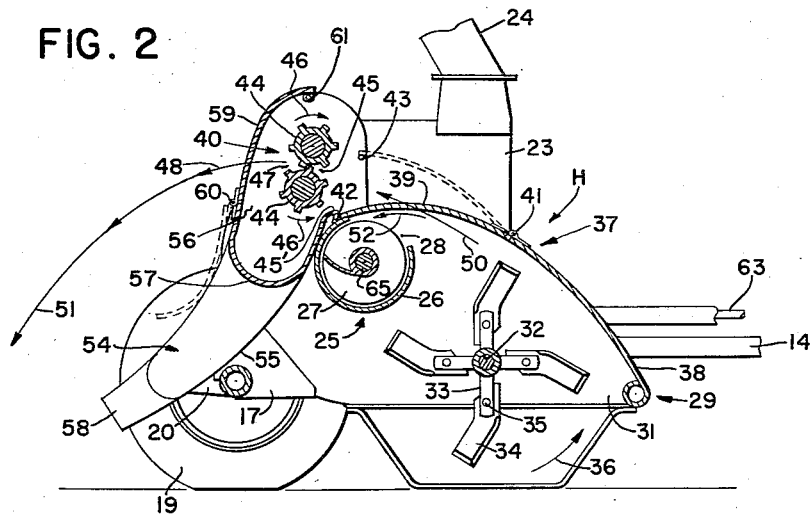
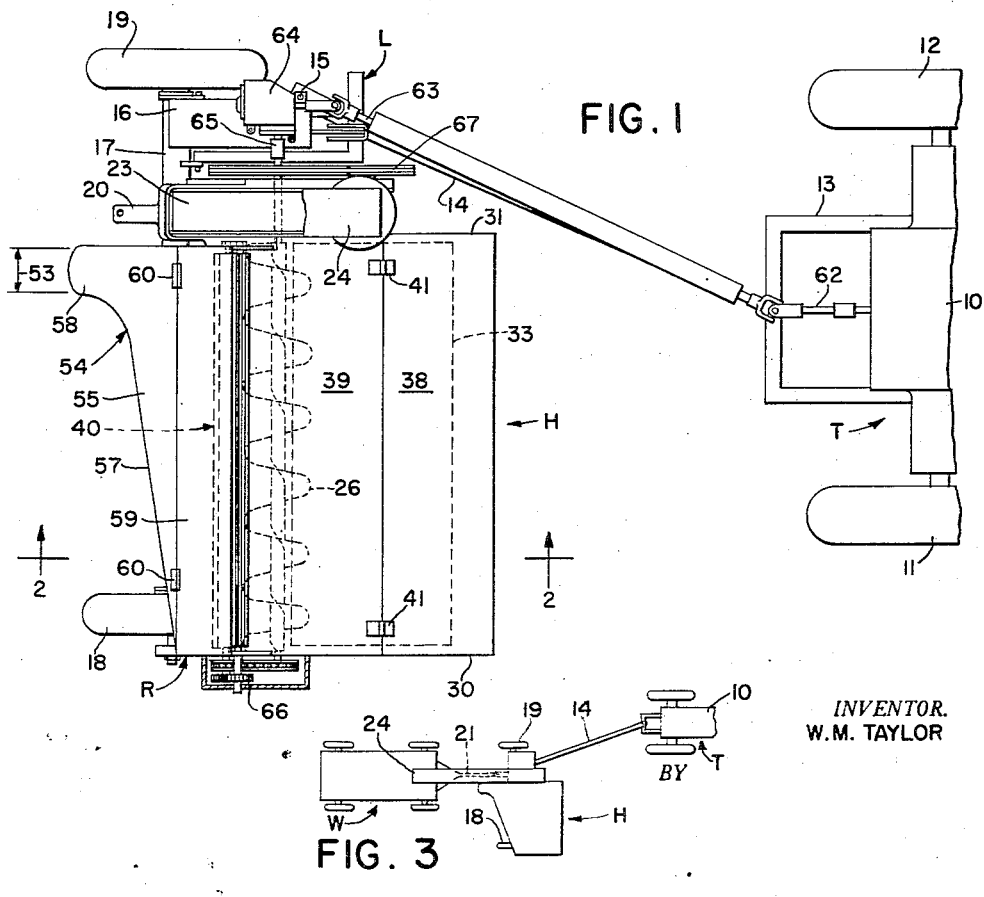
*INVENTOR.*
W.M. TAYLOR

United States Patent Office 2,827,745
Patented Mar. 25, 1958

2,827,745

COMBINATION CHOPPER, WINDROWER AND CRUSHER

William M. Taylor, Ottumwa, Iowa, assignor to Deere Manufacturing Co., Dubuque, Iowa, a corporation of Iowa Application December 22, 1955, Serial No. 554,894

11 Claims. (Cl. 56—1)

This invention relates to a harvester and more particularly to a harvester incorporating combined structure and functions to serve as a chopper, windrower and crusher.

Crops, especially those used for forage, may be harvested in many ways, but ultimately they should be reduced to such lengths to permit easy storage and convenient and palatable feeding to livestock. It is conventional practice to harvest crops, for example, by means including a cutter bar of the mower type, which is used principally in grasses and like crops. The machine includes a conveyor by means of which the severed crops are fed to chopping means which in turn delivers the crops to a trailing vehicle drawn in tandem with the harvester. More recently, there has been developed a harvester having a crop-collecting means of the rotary type, which functions not only to sever the crops from the ground but to lift and throw the crops rearwardly into a blower for ultimate discharge to a trailing vehicle, generally in the manner described above, but with the important exception that the over-all machine is considerably simpler, since many of the moving parts of older machines are eliminated. Although machines of this character are suitable for the purposes intended, they lose some of their flexibility for operation on crops of other types, for example crops that are not intended for immediate storage. In such cases, it is desirable that the crops be returned to the ground after harvesting, so that they will have time to cure. It is only with substantial modification that machines referred to above can be modified to permit the return of the harvester crops to the ground. As an expedient to the curing of crops, it is not unknown to utilize conditioning means, usually in the form of crushing rollers or equivalent devices, for macerating or otherwise treating the crops to accelerate curing thereof.

It is an important object of the present invention to provide a universal machine having capabilities adequate to permit the use of the machine in the handling of a wide variety of crops and to afford a wide variety of end results. For example, the machine may be used as a conventional rotary chopper, gathering the crops and feeding the crops to a conveyor for delivery by a blower or the like to a trailing vehicle. The machine may also be used to return the harvested crops directly to the ground in a relatively wide swath, the crops being first caused to be passed through suitable crushing means or an equivalent conditioning device for accelerating curing. As a further feature, the machine makes it possible to confine the relatively wide swath of crops into a narrow windrow. The invention features means in a single machine for selectively obtaining operation along the lines noted above. It is an important object of the invention to utilize a simple design embodying known principles, combined in such manner as to produce wholly novel results in combination, yet the benefits of each mechanism in operation by itself are not sacrificed.

The foregoing and other important objects and desirable features inherent in and encompassed by the invention will become apparent as a preferred embodiment of the invention is disclosed, by way of example, in the ensuing specification and accompanying sheet of drawings, the several figures of which will be described immediately below.

Fig. 1 is a plan view, with portions broken away, of a tractor and harvester interconnected in transport relationship.

Fig. 2 is an enlarged fragmentary section on the line 2—2 of Fig. 1.

Fig. 3 is a schematic view, on a reduced scale, showing the operative relationship between a tractor, the harvester and a trailing vehicle or receptacle.

In Fig. 3, the tractor is designated generally by the letter T, and the letters H and W respectively indicate the harvester and a trailing wagon, the latter being typical of a receptacle conventionally used with harvesters in the gathering of forage crops.

The tractor may be of conventional construction, comprising a longitudinal or fore-and-aft body 10 carried on right and left hand traction wheels 11 and 12, and including a drawbar 13 by means of which a draft connection may be made to a tongue 14 of the harvester H. The tongue 14 is conventionally pivoted at 15 to a subframe 16 which comprises part of the mobile frame 17 of the harvester, the mobility of the harvester frame being effected by right and left hand ground wheels 18 and 19, respectively. Because of the pivot of the tongue 14 at 15, the lateral relationship between the tractor and the harvester may be varied. For example, in transport relationship, as shown in Fig. 1, it is desirable that the harvester trail the tractor so as to narrow the transverse dimension of the unit, whereas in operating relationship (Fig. 3) the harvester is offset to the right of the tractor so as to operate on crops growing in the field just to the right of the right hand wheels of the tractor. The trailer or wagon W is normally connected directly behind the harvester, the harvester frame 17 including a wagon hitch, as at 20, for connection to the draft tongue 21 of the wagon. These details are in general well known and are deemed to require no elaboration.

The harvester has a relatively substantial transverse dimension or width, established by the tread or transverse spacing between the wheels 18 and 19, and the harvester as a whole has right and left hand opposite sides R and L, respectively, spaced transversely apart. The subframe 16, as well as auxiliary structure not important here, serves to mount on the frame 17 crop-receiving means 23 having a housing including an outlet in the form of a rearwardly and upwardly extending discharge spout 24. As shown in Fig. 3, the spout extends to the rear and discharges into the trailer or wagon W. The housing 23 may contain a conventional delivery fan or blower (not shown) for impelling the crops from the housing to the wagon via the spout 24. A representative arrangement is depicted in the U. S. patent to Tuft 2,507,742, which patent also shows one type of harvester in which the crops are severed from the ground, conveyed to a combination blower and chopper and delivered by the blower and chopper to a trailing vehicle via a discharge spout like the spout 24 here. It will be noted in the patent that the blower in the housing contains knives for chopping up the crops. In a harvester of the type disclosed in the instant case, a simple blower without knives may be used, because the picking up of the crops from the ground entails a chopping operation that makes unnecessary a chopping operation in the housing 23. These features will be brought out below.

The right hand side of the housing 23 has a crop inlet opening (not visible) which is fed by conveyor means 25. This conveyor means is transverse as respects the line of advance and comprises an elongated auger trough 26 and an auger 27 therein. The trough 26 is open at its top to provide a crop inlet 28. The auger is rotated, by means to be presently described, in such direction as to feed crops to the left and into the blower housing 23, it being understood that the inlet opening 28 is transversely co-extensive in length with the length of the trough 26 and, therefore, co-extensive in length with the transverse dimension of crop-collecting means, designated in its entirety by the numeral 29, on the main frame 17 ahead of the conveyor means 25. The crop-collecting means includes right and left hand upright walls 30 and 31 which afford right and left hand supports for opposite ends of a transverse rotor shaft 32, which shaft effects the central axis of a rotor 33 of the radial arm type. In the simple illustration shown here, the arms 34 are pivoted at 35 on the hub of the rotor and the direction of rotation of the rotor, as illustrated by the arrow 36, is such that crops picked up or removed from the field are thrown generally upwardly ahead of the rotor.

However, the direction of movement of the crops is confined and directed by roof means, indicated in its entirety by the numeral 37, so that the crops are caused to move upwardly and rearwardly. The roof means comprises a transverse forward section 38 directed upwardly and rearwardly in the upper front quadrant of the rotor so as to cause the crops ot move in the general direction of the conveyor means 25. The roof means also includes a bi-positionable rear or second roof section 39, selectively positionable to occupy either a first status for causing the crops to pass to crushing means 40 or in a second status to cause the crops to enter directly through the conveyor means inlet 28 to be conveyed to the left by the auger 27. The first status of the rear roof section 39 is illustrated in dotted lines in Fig. 2 and its second status is illustrated in full lines in the same figure. Movability of the section 39 relative to the section 38 is preferably accomplished by a transverse hinge at 41. A pair of means, illustrated generally as lock elements 42 and 43, may be used for retaining the respective positions of the section 39.

The crushing means comprises a pair of corrugated rolls 44, having their axes parallel and their length coextensive with the length of the conveyor means 25. The arrangement of the rolls 44 is such that they form a transverse crop-receiving bite or inlet 45 at a level above the conveyor means inlet 28, and the direction of rotation of the rolls (arrows 46) is such that crops are discharged through a rear outlet 47, or are ejected in the path indicated generally by the arrow 48, which path of ejection is clear of the conveyor means 25.

With the roof section 39 in the dotted line position (Fig. 2), or removed altogether, the roof section 38 is sufficient to confine the movement of the crops in a rearward trajectory 50 such that the crops pass in a relatively wide stream directly into the inlet 45 of the crusher rolls 44. As these rolls rotate, the crops pass therethrough from front to rear and are ejected in the path represented by the arrow 48. Since the rotor 33 (dotted lines Fig. 1) is of relatively wide dimension, and since the crushing rolls 44 are co-extensive in length with that dimension, the crops are picked up from the ground in a relatively wide swath and are conveyed rearwardly by the action of the rotor in a stream having the same width as the swath, after which the crops pass through the crushing rolls in a stream of the same width and are ejected at 48 to drop to the ground (arrow 51) as a crushed or conditioned swath for curing on the ground before being subsequently picked up in a future operation. When the section 39 is in the full-line position of Fig. 2, the trajectory 50 is altered and the crops are deflected downwardly and rearwardly (arrow 52) directly through the conveyor means inlet 28. In other words, when the roof section 39 is in the dotted line position, the conveyor means 25 is by-passed, or the crops are delivered exclusively to the crushing means 40, whereas, when the section 39 is in its second or lowered status, the crop trajectory 50 is intercepted and the crops are delivered exclusively to the conveyor means 25. The position of the roof section 39 depends on the type of crop treatment desired. If the crops are to be collected by the blower housing 23 for delivery to the wagon W, the ful-line position of the section 39 is utilized. If the crops are to be returned to the ground after conditioning by the crusher means 40, then the by-pass of the conveyor means 25 is achieved by positioning of the section 39 in its dotted line status. A shelf 45' extends forwardly below the lower roll 44 and facilitates crop entry to the inlet 45. The front edge of this shelf is rolled and establishes the lock element past which the rear edge of the roof section 39 can snap for lock and release thereof.

Operation of the machine as a crop conditioner for return of the crops to the ground has two optional phases; namely the crops may be returned to the ground as a relatively wide stream (arrow 51) or they may be retuned to the ground in a narrow windrow 53 through the intermediary of windrowing means 54. The windrowing means is positioned directly behind the conveyor means 25 and directly below the crusher rolls 44. The windrowing means comprises a trough 55 having an upper open top or crop-receiving inlet 56 and a closed bottom 57, except for the provision of a relatively narrow outlet or discharge spout 58. The bottom 57 of the trough is inclined to the horizontal so that it slopes downwardly, to the rear and to the left, the shape of the trough thus affording means for narrowing the stream of crops from the width of the windrowing means opening 56 to the width of the exit of the spout 58 so as to afford the narrow windrow 53. The relative widths of the trough proper and the spout 58 may be varied at will. That shown is merely representative.

Whether or not the crushed or conditioned crops are delivered to the ground as a wide swath or as a narrow windrow at 53 depends upon the position or status of a control device or deflector 59. In the prefered embodiment illustrated, the deflector 59 is hinged at 60 to a rear upper part of the windowing means 54 and is capable of occupying a first status as shown in full lines in Fig. 2 or a second status or position as shown in dotted lines in Fig. 2. When the shield or deflector 59 is in the full-line position, it may be retained in place by any appropriate means, such as those indicated at 61. In this position of the shield, the shield intercepts the rearward path of ejection (arrow 48) and causes the conditioned or crushed crops to drop directly into the trough 55, whereby the wide stream is narrowed as it moves to the left and exits to the rear through the windrowing spout 58. When the shield 59 is in its dotted line position (Fig. 2), it does not form an obstacle to the path of ejection (arrow 48) and consequently the conditioned crops are ejected or discharged rearwardly to follow from the path 48 to the path 51 which is therefore discharged to the ground in a relatively wide stream or swath.

Power for driving the rotating parts of the harvester is derived in the first instance from a power take-off shaft 62 on the tractor T. A typical propeller shaft 63 is used to transmit power from the power take-off shaft of the tractor to a gear housing 64 on the sub-frame 16 of the harvester. A transverse shaft 65 drives not only the blower (not shown) in the blower housing 23 but also the coaxial auger 27, a type of drive that in itself is not new, being shown in the U. S. patent to Coultas 2,373,169.

The right hand end of the drive shaft 65 serves, by means of drive mechanism 66 to drive the crusher rolls 44. A belt drive 67 at the left hand side of the machine takes power from the shaft 65 to the rotor shaft 32. The drive details do not by themselves form part of the invention and could be varied to suit individual desires.

The operational characteristics of the machine are deemed to have been set forth above and need no repetition. Features of the invention not categorically enumerated will undoubtedly occur to those versed in the art, as will many modifications and alterations in the preferred structure disclosed, all of which may be achieved without departing from the spirit and scope of the invention.

What is claimed is:

1. A harvester, comprising: a mobile frame adapted to advance over a field of crops and having opposite transversely spaced apart sides; a crop-receiving means on the frame at one side thereof; transverse conveyor means on the frame and feeding to the crop-receiving means, said conveyor means having an upper forward crop inlet; crop-crushing means on the frame and extending transversely thereof at a level above the conveyor means inlet, said crushing means having a front crop inlet and a rear crop outlet and said outlet discharging clear of the conveyor means; crop-collecting means on the frame ahead of the conveyor means and including a rotor on a transverse axis adapted to remove crops from the field and to throw such crops generally tangentially upwardly ahead of said rotor; roof means over the rotor and including a forward section positioned to intercept the thrown crops and directed rearwardly and upwardly to cause the crops to move in a trajectory leading to the crushing means inlet in by-passing relation to the conveyor means, whereby such crops will be discharged via the crushing means outlet; and said roof means having a rear section movable selectively relative to the front section between a first status enabling said trajectory to the crushing means and a second status in which said rear section is directed downwardly below the level of the crushing means inlet and in overlying relation to the conveyor means inlet for modifying said trajectory to deflect crops downwardly and directly into said conveyor means inlet to the exclusion of the crushing means.

2. The invention defined in claim 1, including: windrow means behind the crushing means and transversely co-extensive therewith for receiving crops from the crushing means outlet, said windrow means being operative to deliver crops laterally toward one side of the harvester.

3. A harvester, comprising: a moble frame adapted to advance over a field of crops and having opposite transversely spaced apart sides; a crop-receiving means on the frame at one side thereof; transverse conveyor means on the frame and feeding to the crop-receiving means, said conveyor means having an upper forward crop inlet; crop-windrowing means rearwardly of the conveyor means and having an upper inlet of substantial transverse width and a lower outlet of relatively narrow transverse dimension, said windrowing means being operative to direct received crops toward and for discharge by said lower outlet; crop-crushing means on the frame at a level above both the conveyor means and windrowing means inlet and being substantially transversely co-extensive with said windrowing means inlet, said crushing means having a front inlet and a rear outlet; means driving the crushing means to move crops therethrough from front to rear and operative to discharge crops over and rearwardly beyond the windrowing means and in by-passing relation to the windrowing means inlet; crop-collecting means on the frame ahead of the conveyor means and including a rotor on a transverse axis adapted to remove crops from the field and to throw such crops generally tangentially upwardly ahead of said rotor; roof means over the rotor and including a forward section positioned to intercept the thrown crops and directed rearwardly and upwardly to cause the crops to move in a trajectory leading to the crushing means inlet in by-passing relation to the conveyor means, whereby such crops will be discharged via the crushing means outlet; said roof means having a rear section movable selectively relative to the front section between a first status enabling said trajectory to the crushing means and a second status in which said rear section is directed downwardly below the level of the crushing means inlet and in overlying relation to the conveyor means inlet for modifying said trajectory to deflect crops downwardly and directly into said conveyor means inlet to the exclusion of the crushing means; and deflector means selectively movable between a first status enabling the crushing means to discharge rearwardly beyond the windrowing means and a second status disposed upwardly behind the crushing means to intercept the crops discharged by the crushing means so as to deflect said crops into the windrowing means inlet.

4. A harvester, comprising: a mobile frame adapted to advance over a field of crops and having opposite transversely spaced apart sides; conveyor means on the frame and feeding toward one side of the frame, said conveyor means having a crop inlet; crop-crushing means on the frame spaced from the conveyor means, said crushing means having a crop inlet and a crop outlet and said outlet discharging clear of the conveyor means; crop-collecting means on the frame adjacent to the conveyor means and including a rotor adapted to remove crops from the field and to throw such crops generally tangentially upwardly; roof means over the rotor and including a first section positioned to intercept the thrown crops and to cause the crops to move in a trajectory leading to the crushing means inlet in by-passing relation to the conveyor means, whereby such crops will be discharged via the crushing means outlet; and said roof means having a second section movable selectively relative to the first section between a first status enabling said trajectory to the crushing means an a second status in which said second section is directed away from the crushing means inlet and toward the conveyor means inlet for modifying said trajectory to deflect crops directly into said conveyor means inlet to the exclusion of the crushing means.

5. The invention defined in claim 4, including: windrow means adjacent to and for receiving crops from the crushing means outlet, said windrow means being operative to laterally confine received crops and to discharge such crops onto the ground in windrow form.

6. A harvester, comprising: a mobile frame adapted to advance over a field of crops and having opposite transversely spaced apart sides; a crop-receiving means on the frame at one side thereof; transverse conveyor means on the frame and feeding to the crop-receiving means, said conveyor means having an upper forward crop inlet; crop-crushing means on the frame and extending transversely thereof at a level above the conveyor means inlet, said crushing means having a front crop inlet and a rear crop outlet and said outlet discharging rearwardly over and clear of the conveyor means; crop-collecting means on the frame ahead of the conveyor means and operative to remove crops from the field and to deliver crops rearwardly toward said conveyor means; and means selectively operative to cause delivery of the crops to the conveyor means inlet exclusively of the crushing means or to the crushing means inlet exclusively of the conveyor means.

7. A harvester, comprising: a mobile frame adapted to advance over a field; crop-receiving means on the frame and including an inlet and an outlet, said outlet including a delivery spout for discharge to a receptacle connected to the frame; crop-crushing means on the frame and including an inlet and an outlet, said crop-crushing means outlet being operative to discharge crops onto the ground in a relatively wide swath; crop-collecting means on the frame for removing crops from the ground in a swath generally corresponding to the aforesaid swath as the harvester advances; and means operative selectively to deliver crops rearwardly from the crop-collecting means exclusively to the crop-receiving means or exclusively to the crushing means.

8. The invention defined in claim 7, including: windrowing means carried by the frame for narrowing the swath discharged by the crushing means, said windrowing means including a crop control device selectively operative to direct crushed crops into said windrowing means or to direct crushed crops directly to the ground exclusively of said windrowing means.

9. A harvester, comprising: a mobile frame adapted to advance over a field of crops and having transversely spaced apart sides; crop-receiving means on the frame at one side thereof, transverse conveyor means on the frame and feeding to the crop-receiving means, said conveyor means having an upper forward transversely disposed crop inlet; a crop trough on the frame and extending transversely behind the conveyor means and having an open top, said trough having a bottom inclined to the horizontal and having its lowermost portion at one side of the frame, and said portion having a discharge opening therein leading to the ground; crop-crushing means positioned above the open top of the trough and rearwardly of the conveyor means inlet, said crushing means having a front inlet and a rear outlet; means driving the crushing means to pass crops therethrough from front to rear to eject crops over and rearwardly beyond the open top of the trough; crop-collecting means on the frame ahead of the conveyor means and including a rotor on a transverse axis adapted to remove crops from the field and to throw such crops generally tangentially upwardly ahead of said rotor; roof means over the rotor and including a forward section positioned to intercept the thrown crops and directed rearwardly and upwardly to cause the crops to move in a trajectory leading to the crushing means inlet in by-passing relation to the conveyor means, whereby such crops will be discharged via the crushing means outlet; said roof means having a rear section movable selectively relative to the front section between a first status enabling said trajectory to the crushing means and a second status in which said rear section is directed downwardly below the level of the crushing means inlet and in overlying relation to the conveyor means inlet for modifying said trajectory to deflect crops downwardly and directly into said conveyor means inlet to the exclusion of the crushing means; and deflector means selectively movable between a first status enabling the crushing means to discharge rearwardly beyond the open top of the windrowing means and a second status disposed upwardly behind the crushing means to intercept the crops discharged by the crushing means so as to deflect said crops into the windrowing means open top.

10. A harvester, comprising: a mobile frame adapted to advance over a field of crops and having opposite transversely spaced apart sides; crop-collecting means on the frame operative to remove crops from the field and to cause such crops to move rearwardly in a relatively wide stream; relatively wide crop-crushing means on the frame positioned to receive crops from the crop-collecting means and operative to crush and eject the crops rearwardly and downwardly to the ground as a continuation of said stream; windrowing means on the frame behind the crushing means and having an inlet of sufficient width to receive said stream; said inlet being positioned below the stream of crops ejected by the crushing means so that said stream passes over and rearwardly beyond said inlet; deflector means operative in one status to enable ejection of crops over and beyond said windrowing means inlet and operative selectively in another status to deflect the crops into the windrowing means via said inlet; and said windrowing means having an outlet materially narrower than said stream and leading to the ground, and means for narrowing the stream to pass through said outlet to the ground in windrow form.

11. A harvester, comprising: a mobile frame adapted to advance over a field of crops and having opposite transversely spaced apart sides; a crop-receiving means on the frame at one side thereof; transverse conveyor means on the frame and feeding to the crop-receiving means, said conveyor means having an upper forward crop inlet; crop-crushing means on the frame and extending transversely thereof at a level above the conveyor means inlet, said crushing means having a front crop inlet and a rear crop outlet and said outlet discharging clear of the conveyor means; crop-collecting means on the frame ahead of the conveyor means and including a device adapted to remove crops from the field and to throw such crops rearwardly toward the conveyor means inlet; guide means cooperating with the device and including a fixed guiding section and a movable guiding section, said movable guiding section being movable selectively relative to the fixed guiding section between a first status enabling delivery of said crops to the crushing means in by-passing relation to the conveying means and a second status in which said crops are deflected downwardly and directly into said conveyor means inlet to the exclusion of the crushing means.

References Cited in the file of this patent
UNITED STATES PATENTS

| | | |
|---|---|---|
| 2,157,619 | McElwain | May 9, 1939 |
| 2,571,652 | Bass | Oct. 16, 1951 |
| 2,641,097 | Mast | June 9, 1953 |
| 2,674,839 | Russell | Apr. 13, 1954 |